United States Patent [19]

Macrander et al.

[11] 4,027,235

[45] May 31, 1977

[54] DIRECT CURRENT COMPENSATION CIRCUIT WITH CURRENT THRESHOLD DETECTION

[75] Inventors: Max S. Macrander, Warrenville; Ronald F. Kowalik, Lombard, both of Ill.

[73] Assignee: GTE Automatic Electric Laboratories Incorporated, Northlake, Ill.

[22] Filed: Aug. 13, 1976

[21] Appl. No.: 714,438

[52] U.S. Cl. .................... 323/48; 179/18 FA; 340/253 R; 307/350
[51] Int. Cl.² ................ H01F 13/00; H01F 19/02
[58] Field of Search ............ 323/44 R, 48, 61, 62, 323/21; 179/18 F, 18 FA; 340/189 R, 210, 248 R, 253 R, 253 M, 253 P; 307/235 R

[56] References Cited

UNITED STATES PATENTS

| 3,714,548 | 1/1973 | Macrander | 323/62 |
| 3,781,571 | 12/1973 | Lord | 307/235 R |
| 3,821,486 | 6/1974 | Mussman | 179/18 FA |
| 3,838,223 | 9/1974 | Lee et al. | 179/18 FA |

*Primary Examiner*—Gerald Goldberg
*Attorney, Agent, or Firm*—Donald J. Lenkszus; David W. Heid

[57] ABSTRACT

A circuit for use with a transformer having a plurality of windings monitors the direct current flow through a first winding and provides a corresponding compensation current to a second winding. The circuit also provides an output signal indicating whether the magnitude of the compensation current is greater than or less than a predetermined magnitude.

8 Claims, 2 Drawing Figures

DIRECT CURRENT COMPENSATION CIRCUIT WITH CURRENT THRESHOLD DETECTION

BACKGROUND OF THE INVENTION

1. Field of the Invention

This invention relates to a circuit for direct current compensation and detection for transformer coupled circuits.

2. Description of the Prior Art

In the past, two problems often encountered in telephone systems have required independent solutions. One of these problems pertains to providing direct current compensation of transformers used to separate a subscriber line and a telephone switching system. The other problem pertains to detecting subscriber signaling.

Transformers are typically employed in telephone systems to provide direct current separation between subscriber loops and switching networks. One problem that has been encountered is that a direct current flow in the subscriber loop may cause saturation of the transformer thereby causing distortion of alternating current signals transmitted through the transformer. A direct current compensation circuit solving this problem is described in U.S. Pat. No. 3,714,548 which issued Jan. 30, 1973 to M.S. Macrander and which is assigned to the assignee of this invention. That compensation circuit is connected to a subscriber loop and to a compensation winding of the transformer and is arranged so that any direct current flow in the subscriber loop will result in a corresponding direct current flow in the compensation winding so that magnetic fields produced in the transformer by the direct currents cancel each other.

Direct current signaling is typically employed in subscriber loops to indicate to telephone switching equipment whether a subscriber line is idle or busy, to initiate service requests and to transmit called number information in the form of dial pulses. With such signaling each subscriber loop is opened to indicate an idle condition, closed to indicate a busy condition or a request for service, or closed and opened in sequence to indicate dial pulses. Each time the loop is closed, direct current from the switching equipment flows in the loop.

Telephone switching equipment has included various circuits to detect signaling information. Typical of these past approaches to signaling detection are the detector circuits shown in U.S. Pat. No. 3,579,106 which issued May 18, 1971 to M.R. Lord and in U.S. Pat. No. 3,781,571 which issued Dec. 25, 1973 to M.R. Lord. In U.S. Pat. No. 3,579,106 a loop current detector is described wherein the currents flowing in both legs of a loop are amplified independently and thereafter combined. The combined current is compared against a reference current to produce an output signal when the combined current exceeds the reference current by a predetermined amount sufficient to bias a threshold network. In the detector circuit described in the above-referenced U.S. Pat. No. 3,781,571 a resistor is connected in each leg of the loop. A direct current amplifier coupled to one of the resistors provides an output signal proportional to the loop current. The output of the amplifier is coupled to the input of a voltage threshold detector. The voltage drop across the other resistor is also coupled to the input of the threshold detector. The threshold detector provides an output to indicate when the input voltage is less or greater than a reference voltage.

Other past approaches to signaling detection employed bridge-type signaling detectors such as shown in U.S. Pat. No. 3,821,486 which issued June 28, 1974 to H.W. Mussman and in U.S. Pat. No. 3,156,778 which issued Nov. 10, 1964 to F.P. Cirone or non-linear resistance elements in the subscriber loop such as shown in Great Britain Pat. No. 1,000,362 to D.C. Emmonds, published Aug. 4, 1965.

SUMMARY OF THE INVENTION

The present invention is an improvement of the circuit of the U.S. Pat. No. 3,714,548 referred to above.

In accordance with the invention, a direct current compensation circuit for use with a transformer having a plurality of windings monitors the direct current flow through a first winding and provides a compensation current to a second winding and further provides an output signal indicating whether the magnitude of the compensation is greater than or less than a predetermined magnitude.

A circuit in accordance with the principles of the invention, includes a first resistance and serially connected diode connected in series with the first winding; second and third serially connected resistors having a combined resistance substantially equal to the resistance of the first resistor; a first transistor having its emitter terminal serially connected to the third resistance, its collector terminal connected to the compensation winding and its base terminal connected to the first winding; and a voltage threshold circuit connected to a node between the second and third resistances.

In at least one important embodiment of the invention, the threshold circuit includes a second transistor having its base terminal connected between the second and third resistances and its emitter terminal connected to a fourth resistor having a resistance less than the resistance of the third resistor.

DETAILED DESCRIPTION

Figure 1:
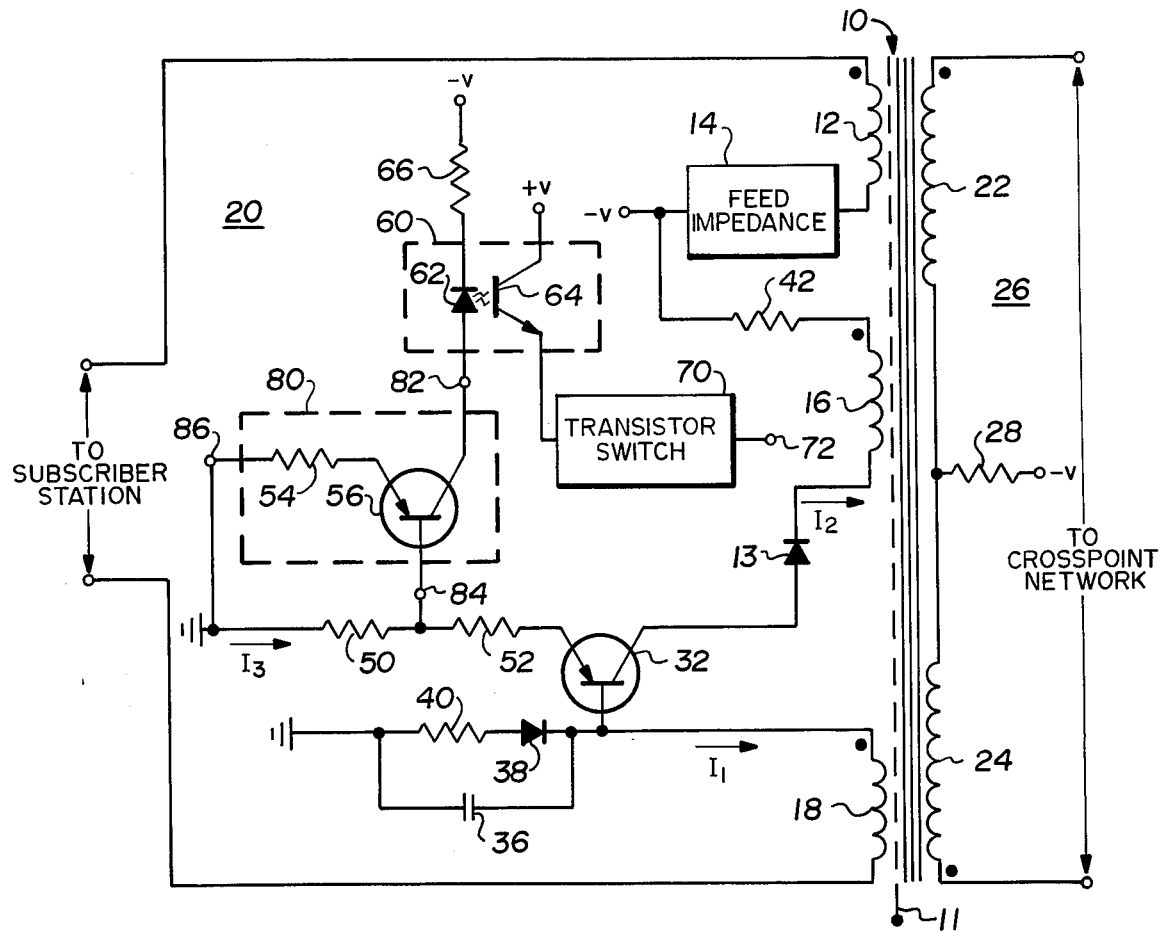
FIG. 1 shows in schematic form an embodiment of the invention.

With reference now to FIG. 1, there is schematically shown a transformer 10 having an optional shield 11, windings 12 and 18 connected in a subscriber loop 20, compensation winding 16, and winding 22 and 24 in a crosspoint loop 26. A conventional power source, −V, is connected to the winding 12 via a standard resistance feed network 14, to the compensation winding 16 via a resistor 42, and to the windings 22 and 24 via a resistor 28. The power source, −V, may be a −48 volt central office battery commonly used in telephone systems. A first transistor 32 has its collector connected via diode 13 to the input of compensation winding 16, emitter connected via serially connected resistors 50 and 52 to ground potential, and base connected to subscriber loop transformer winding 18. A first resistance means including serially connected resistor 40 and diode 38 connect the base of the transistor 32 to ground potential. The diode 38 is provided to compensate for the emitter-to-base voltage drop across the transistor 32. A capacitor 36 is connected in shunt across the resistor 40 and diode 38 so that a.c. signals will bypass the resistor 40 and diode 38. An additional resistor 42 is connected between the compensation winding 16 and −V, to limit the dissipation of transistor 32 and its value preferably is selected such that the transistor 32 does not saturate. It will be understood, however, that if transistor 32 were of a high power dissipation type, the resistor 42 would not be necessary. A voltage threshold detector 80 has a first terminal 86 connected to ground potential, an input terminal 84 connected to the node between resistors 50 and 52 and an output terminal 82 connected to a current responsive means including an opto-isolator 60 and switch means 70. The voltage threshold detector includes a transistor 56 having its emitter connected to terminal 86 via fourth resistor 54; its base connected to terminal 84 and its collector connected to terminal 82.

The opto-isolator comprises a photo-emissive source of light emitting diode 62 connected via resistor 60 to supply voltage −V; and photo-responsive means 64 coupled to the light emitting diode 62. The switch means 70 is a transistor switch of the type well known in the art. There is thus provided a first or subscriber loop including transformer windings 12 and 18 and a second or auxiliary transformer loop including winding 16.

Assuming a transistor 32 with a transport efficiency of 100%, the ratio of direct current, $I_1$, flowing in the subscriber loop to the direct current $I_2$ flowing in the auxiliary transformer loop 16 is equal to the ratio of the resistances of resistor 40 ($R_{40}$) to resistor 50 ($R_{50}$) and resistor 52 ($R_{52}$). The ratio is selected such that the d.c. ampere-turns of the subscriber loop is substantially equal to that of the auxiliary transformer loop; i.e.

$$(W_{12} + W_{18}) I_1 = (W_{16}) I_2 \quad (1)$$

wherein $W$ is the number of turns in the transformer winding corresponding to the particular subscript. Due to the effect of the transistor base current, which is dependent upon the transistor transport efficiency, a slight correction in the ratio of resistances $R_{40}$ to $R_{50} + R_{52}$ may be required. If, however, the transistor 32 is selected to have a transport efficiency of at least 98%, the maximum difference in the d.c. ampere-turn products in the subscriber and auxiliary transformer loops due to transistor base current is less than 4 percent, which is usually sufficiently small to be neglected in actual practice. It will thus be seen that by selecting the values of resistors 50 and 52 to be substantially to the value of resistor 40, the currents $I_1$ in the subscriber loop and $I_2$ in the auxiliary transformer loop will be made equal by selecting the transformer 10 such that $W_{12} + W_{18} = W_{16}$. With this arrangement there can be no net direct current magnetization in the transformer 10.

The value of capacitance 36 is selected such that the shunt impedance of the d.c. compensating circuit is negligible for any a.c. signals of a frequency at least equal to the inverse of the $R_{40}C_{36}$ product; i.e. there will be negligible losses for a.c. signals of a frequency $$f \geq [1/2\pi(R_{40}C_{36})] \quad (2)$$

wherein $f$ is the a.c. signal frequency $R_{40}$ is the value of resistor 40 and $C_{36}$ is the value of capacitor 36. Thus a.c. signals, which may, of course, be speech, other analog data or digital data, are transmitted to the crosspoint side of the transformer 10 without any substantial attenuation. It is further desirable in some instances, such as back to back operation of two such transformers, to select the value of capacitance 36 such that the low corner frequency point is optimized from the standpoint of compensating low frequency losses due to the inherent inductance of transformer 10.

It should be noted that the current $I_3$ flowing through the resistor 50 is substantially equal to the current $I_2$. The current $I_4$ flowing into the emitter of transistor 56 is determined as follows:

$$I_4 = (I_3 R_{50} - V_{BE})/R_{54}$$

where $V_{BE}$ is the base-emitter voltage of transistor 56. Thus it can be seen that transistor 56 will be inactive until $I_3 = V_{BE}/R_{50}$. For currents in excess of $V_{BE}/R_{50}$ the transistor 56 will become active and a current $I_4$ will flow.

By way of illustrative example in an embodiment of the invention utilized with subscriber loops coupled to a PAX (Private Automatic Exchange) or a PABX (Private Automatic Branch Exchange) the following circuit values were used:

$R_{40} = 400$ ohms;
$R_{50} = 30$ ohms;
$R_{52} = 370$ ohms; and
$R_{54} = 20$ ohms.

In the absence of signaling, leakage currents may cause current $I_1$ to be at a level of 11 milliamperes. When signaling is present, current $I_1$ will be at a minimum level of 20 milliamperes. As explained hereinabove the current $I_3$ will be substantially equal to the current $I_1$. The base to emitter voltage of the transistor 56, $V_{BE}$, is typically a minimum of 0.35 volts to a maximum of 0.5 volts. If only leakage currents are flowing in the subscriber loop, the voltage drop across resistor 50 is less than 0.35 volts and therefore the transistor 56 is turned-off. If signaling current is present then the voltage drop across resistor 50 will be greater than 0.5 volts, i.e., approximately 0.6 volts. Since the resistor 54 has a resistance less than that of the resistor 50, transistor 56 will turn on and a current flow of approximately 5 milliamperes will be supplied to the light-emitting diode 62 thereby turning light-emitting diode 62 on. The photo-transistor 64 will in turn cause the switch means 70 to generate an output signal at the terminal 72.

Figure 2:
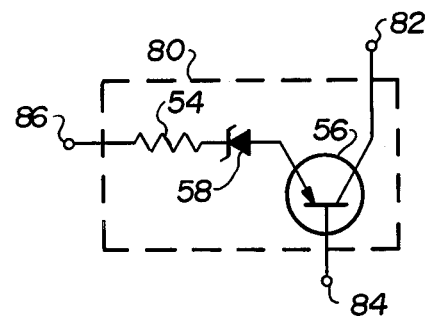
FIG. 2 shows in schematic form an alternate embodiment of a portion of the apparatus of FIG. 1.

In certain telephone switching loops, the difference between a maximum leakage level of current $I_1$ and a minimum signaling level of current $I_1$ may be such that the range of values of $V_{BE}$, i.e., 0.35 volts to 0.5 volts, does not present an adequate threshold margin. Under this situation, a threshold device or zener diode 58 may be inserted between the emitter of transistor 56 and the resistor 54 as shown in the threshold detector 80 of FIG. 2.

Although the present invention is described in an application to a telephone system, it is of equal utility in other applications. Finally, it is to be understood that in the event that an unbalanced d.c. component exists at both sides of a transformer, a second circuit of the same configuration as hereinabove described may be used on the other side of the transformer. In this manner the effects of d.c. may be cancelled from both sides of a single transformer.

From the foregoing it will be seen that a circuit arrangement has been provided for generating compensation currents to a transformer and for detecting current levels above a predetermined threshold. Since certain changes in the above-described construction will occur to those skilled in the art without departure from the spirit or scope of the invention, it is intended that all matter contained in preceeding description or shown in the appended drawing shall be interpreted as illustrative and not in a limiting sense.

What is claimed is:

1. A circuit for monitoring direct current flow from a source into a first winding of a transformer and for supplying a corresponding compensation current to a second winding of the transformer, comprising:

first resistance means connected between said source and said first winding;

a common terminal;

first transistor means having first, second and third terminals, said first terminal being connected to said first winding;

second resistance means connected between said source and said common terminal;

third resistance means connected between said common terminal and said third terminal;

circuit means connecting said second terminal to said second winding;

a fourth resistance means connected to said source;

current responsive means; and a second transistor means having a fourth, fifth and sixth terminal, with said fourth terminal connected to said common terminal, said fifth terminal connected to said current responsive means, and said sixth terminal connected to said fourth resistance means.

2. A circuit in accordance with claim 1 further comprising means connected in shunt across said first resistance means through which alternating current signals bypass said first resistance means without attenuation.

3. A circuit in accordance with claim 2 wherein said second resistance means has a resistance value greater than the resistance value of said forth resistance means.

4. A circuit in accordance with claim 3 wherein said first transistor means includes a transistor having its base connected to said first terminal, its collector connected to said second terminal and its emitter connected to said third terminal.

5. A circuit in accordance with claim 4 wherein said second transistor means includes a transistor having its base connected to said fourth terminal, its collector connected to said fifth terminal and its emitter connected to said sixth terminal.

6. A circuit in accordance with claim 5 wherein said first resistance means includes a diode.

7. A circuit in accordance with claim 4 further comprising a threshold device connected between said sixth terminal and said fourth resistance means.

8. A circuit in accordance with claim 4 wherein said current responsive means includes an opto-isolator.

* * * * *